US00RE36864E

United States Patent [19]

Kagami et al.

[11] E Patent Number: Re. 36,864

[45] Reissued Date of Patent: Sep. 12, 2000

[54] OPTICAL DISK DRIVE AND METHODS FOR COUNTING THE NUMBER OF TRACKS ON AN OPTICAL DISK

[75] Inventors: Naoyuki Kagami, Fujisawa; Hiroaki Kubo, Atsugi; Keiichi Okada, Yokohama, all of Japan

[73] Assignee: International Business Machines Corporation, Armonk, N.Y.

[21] Appl. No.: 08/430,947

[22] Filed: Apr. 28, 1995

Related U.S. Patent Documents

Reissue of:

[64] Patent No.: 5,199,017
Issued: Mar. 30, 1993
Appl. No.: 07/757,775
Filed: Sep. 11, 1991

[30] Foreign Application Priority Data

Sep. 27, 1990 [JP] Japan ..... 2-255466

[51] Int. Cl.[7] ..... G11B 7/00

[52] U.S. Cl. ..... 369/44.28; 369/32

[58] Field of Search ..... 369/44.28, 44.27, 369/32, 44.34, 44.35, 44.36; 360/77.01, 77.06

[56] References Cited

U.S. PATENT DOCUMENTS 4,416,002 11/1983 Oguino et al. ..... 369/44.27
4,484,319 11/1984 Kaishi et al. ..... 369/44.28
4,607,358 8/1986 Maeda et al. ..... 369/32
4,817,069 3/1989 Shigemori ..... 369/44.28
4,849,953 7/1989 Nomura et al. ..... 369/44.28
5,073,885 12/1991 Ito et al. ..... 369/44.28

FOREIGN PATENT DOCUMENTS 1-276474 11/1989 Japan .
1277378 11/1989 Japan .

*Primary Examiner*—Nabil Hindi
*Attorney, Agent, or Firm*—Robert M. Sullivan; Manny W. Schecter

[57] ABSTRACT

The invention is a positive peak level comparator for generating a positive peak pulse when a TES (Tracking Error Signal) is higher than a predetermined positive level, a negative peak level comparator for generating a negative peak pulse when the TES is lower than a predetermined negative level, and a logic circuit for generating an output pulse when said positive peak pulse and said negative peak pulse have been alternately input thereto. The arrangement prevents the TES from being miscounted even if the TES is distrubed due to the occurrence of, for example, a noise at a level close to either said predetermined positive level or said predetermined negative level and either said peak pulse or said negative pulse is successively generated.

10 Claims, 10 Drawing Sheets

TRAJECTORY OF LASER BEAM ON OPTICAL DISK DURING HIGH-VELOCITY SEEK OPERATION

TRACK NUMBER COUNTING DURING HIGH-VELOCITY SEEK OPERATION

TRACK NUMBER COUNTING DURING LOW-VELOCITY SEEK OPERATION

TRAJECTORY OF LASER BEAM ON OPTICAL DISK
DURING LOW-VELOCITY SEEK OPERATION

TRACK NUMBER COUNTING
BY CONVENTIONAL MEANS

OPTICAL DISK DRIVE AND METHODS FOR COUNTING THE NUMBER OF TRACKS ON AN OPTICAL DISK

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an optical disk drive, and is particularly concerned with a method for counting the number of tracks an optical head crosses during a seek operation in an optical disk drive.

2. Description of the Related Art

In an optical disk drive seek operation in which a laser beam (or an optical head) moves from a current position to a target position (or a target track) over the tracks, it is necessary to count the number of tracks the laser beam crosses during the seek operation, based on a TES (Tracking Error Signal), to obtain positional information of the moving optical head.

Optical structures to generate a TES are grouped into several classes, such as a push-pull method, a three-beam method, etc. However, a TES in any method, is a signal of a waveform showing that a positive peak and a negative peak occur alternately each time a laser beam crosses a land part 110 and a groove part 120 of an optical disk 100, as shown in FIG. 12A. Further, the TES is at a zero level when a laser beam passes through the land center 110A of the land part 110 and the groove center 120A of the groove part 120. FIG. 13 shows an example of conventional circuit structure to count the number of tracks an optical head crosses, based on a TES described above. In the figure, a window comparator 131, as shown in FIG. 14, generates a zero cross pulse if a TES is within a predetermined range of the zero level and a track count logic 133 counts the number of zero cross pulses.

On the recording surface of the optical disk 100, the positional information of a data recording part is usually written immediately before the data recording part in a pre-pitted form. Such positional information is called pre-pitted positional information and a pre-pitted portion thus obtained or a defect portion on the optical disk 100 causes noise within the TES when a laser beam crosses the pre-pitted portion or the defect portion. When such noise is caused, the above conventional circuit structure is apt to err in counting the number of tracks.

In the following, such a disadvantage in the circuit structure of the prior art is described in detail.

FIG. 15 shows the trajectory of a laser beam during a low-velocity seek operation. In the figure, a defect portion 150 usually spans more than one track on the recording surface of the optical disk 100. Accordingly, if the seek velocity is low, a laser beam passes through the defect portion 150 while the laser beam passes through one land part 110 and one groove part 120. This causes significant noise within the TES, as shown in FIG. 16. Said noise thus generated causes a pulse and frequently count errors in counting the number of tracks by the track count logic 133. The same problem is also caused if a laser beam passes through a pre-pitted portion. Further, other noises are apt to cause counting errors.

SUMMARY OF THE INVENTION

The principal object of this invention is to ensure that the number of tracks is precisely counted even if a defect portion or a pre-pitted portion which causes noise is on the recording surface of an optical disk, or if noise is caused by other sources.

The invention is a positive peak level comparator for generating a positive peak pulse when a TES (Tracking Error Signal) is higher than a predetermined positive level, a negative peak level comparator for generating a negative peak pulse when the TES is lower than a predetermined negative level, and a logic circuit for generating an output pulse when said positive peak pulse and said negative peak pulse have been alternately input thereto. The arrangement prevents the TES from being miscounted even if the TES is disturbed due to the occurrence of, for example, a noise at a level close to either said predetermined positive level or said predetermined negative level and either said peak pulse or said negative pulse is successively generated.

The invention also includes a filter circuit for passing said tracking error signal of high frequency (generated during a high-velocity seek operation) with high gain and, on the other hand, passing said tracking error signal of low frequency (generated during a low-velocity seek operation) with low gain, a positive peak level comparator for generating a positive peak pulse when the output signal from said filter circuit is higher than a predetermined positive level, a negative peak level comparator for generating a negative peak pulse when the output signal from said filter circuit is lower than a predetermined negative level, and a logic circuit for generating an output pulse when said positive peak pulse and said negative peak pulse have been alternately input, to prevent the TES from being miscounted by the decrease of the amplitude of TES which is apt to be caused if a laser beam crosses a defect portion on the disk during a high-velocity seek operation.

The invention also includes a first positive peak level comparator for generating a positive peak pulse when said tracking error signal is higher than a predetermined first positive level, a first negative peak level comparator for generating a negative peak pulse when said tracking error signal is lower than a predetermined first negative level, a second positive peak level comparator for generating a positive peak pulse when said tracking error signal is higher than a predetermined second positive level lower than said predetermined first positive level, a second negative peak level comparator for generating a negative peak pulse when said tracking error signal is lower than a predetermined second negative level higher than said predetermined first negative level, and a logic circuit for generating an output pulse when said positive peak pulse and said negative peak pulse have been alternately input from said first positive peak level comparator and said first negative peak level comparator, respectively, during a low-velocity seek operation, and for generating an output pulse when said positive peak pulse and said negative peak pulse have been alternately input from said second positive peak level comparator and said second negative peak level comparator, respectively, during a high-velocity seek operation, to prevent the TES from being miscounted by the decrease of the amplitude of TES which is apt to be caused if a laser beam crosses a defect portion on the disk during a high-velocity seek operation.

The invention also includes a window comparator for generating a zero cross pulse when said tracking error signal is within a predetermined range including a zero level, a positive peak level comparator for generating a positive peak pulse when said tracking error signal is higher than a predetermined positive level, a negative peak level comparator for generating a negative peak pulse when said tracking error signal is lower than a predetermined negative level, and a logic circuit for generating an output pulse when said zero cross pulse, said positive peak pulse, and said negative peak pulse have been input in predetermined order, to prevent the TES from being miscounted even if the TES is disturbed by the occurrence of, for example, a noise at a level close to either said predetermined positive level or said predetermined negative level and either said peak pulse or said negative pulse is successively generated, or the TES is disturbed for the reason why said predetermined range including the zero level is exceeded. The invention also includes a window comparator for generating a zero cross pulse when said tracking error signal is within a predetermined range including a zero level, a positive peak level comparator for generating a positive peak pulse when said tracking error signal is higher then a predetermined positive level, a negative peak level comparator for generating a negative peak pulse when said tracking error signal is lower than a predetermined negative level, and a logic circuit for generating an output pulse when said positive peak pulse and said negative peak pulse have been alternately input from said positive peak level comparator and said negative peak level comparator, respectively, during a low-velocity seek operation and generating an output pulse when a zero cross pulse has been input from said window comparator during a high-velocity seek operation, to eliminate the effect of a noise caused by a defect portion, etc. with no use of said window comparator for generating said zero cross pulse if a seek operation is performed at a low velocity.

The invention also includes a window comparator for generating a zero cross pulse when said tracking error signal is within a predetermined range including a zero level, a filter circuit for passing said tracking error signal of high frequency with high gain and, on the other hand, passing said tracking error signal of low frequency with low gain, a positive peak level comparator for generating a positive peak pulse when an output signal from said filter circuit is higher than a predetermined positive level, a negative peak level comparator for generating a negative peak pulse when an output signal from said filter circuit is lower than a predetermined negative level, and a logic circuit for generating an output pulse when said zero cross pulse, said positive peak pulse, and said negative peak pulse have been input in predetermined order, to relatively amplify the amplitude of TES in said filter circuit so as to decrease the effect of the decrease of the amplitude of TES which is apt to extend during a high-velocity seek operation.

The invention also includes a window comparator for generating a zero cross pulse when said tracking error signal is within a predetermined range including a zero level, a pulse discriminator for generating a discriminated zero cross pulse in response to said zero cross pulse whose time width is greater than or equal to a predetermined value, a filer circuit for passing said tracking error signal of said high frequency with high gain and, on the other hand, passing said TES of said low frequency with low gain, a positive peak level comparator for generating a positive peak pulse when an output signal from said filer circuit is higher than a predetermined positive level, a negative peak level comparator for generating a negative peak pulse when an output signal from said filter circuit is lower than a predetermined negative level, and a logic circuit for generating an output pulse when said discriminated zero cross pulse, said positive peak pulse, and said negative peak pulse have been input in predetermined order during a low-velocity seek operation. On the other hand, the arrangement generates an output pulse when said positive peak pulse and said negative peak pulse have been alternately input during a high-velocity seek operation, to decrease or increase a level detected by the level comparators which detect a positive peak and a negative peak of TES if the seek operation of the optical head is at a high or low velocity, respectively, by the filters placed ahead of the level comparator, in which the more frequency becomes low, gain decreases, and prevents tracks from being miscounted by the decrease of the amplitude of TES due to disturbance during a period of high seek velocity and by a noise within TES during a period of low seek velocity, by the pulse discriminator preceded by the window comparator detecting a zero cross of TES, in which a pulse with short time width is not regarded as a pulse.

The foregoing and other objects, features, and advantages of the invention will be apparent from the following more particular description of the preferred embodiment of the invention, as illustrated in the accompanying drawing.

DESCRIPTION OF THE PREFERRED EMBODIMENT

Figure 1:
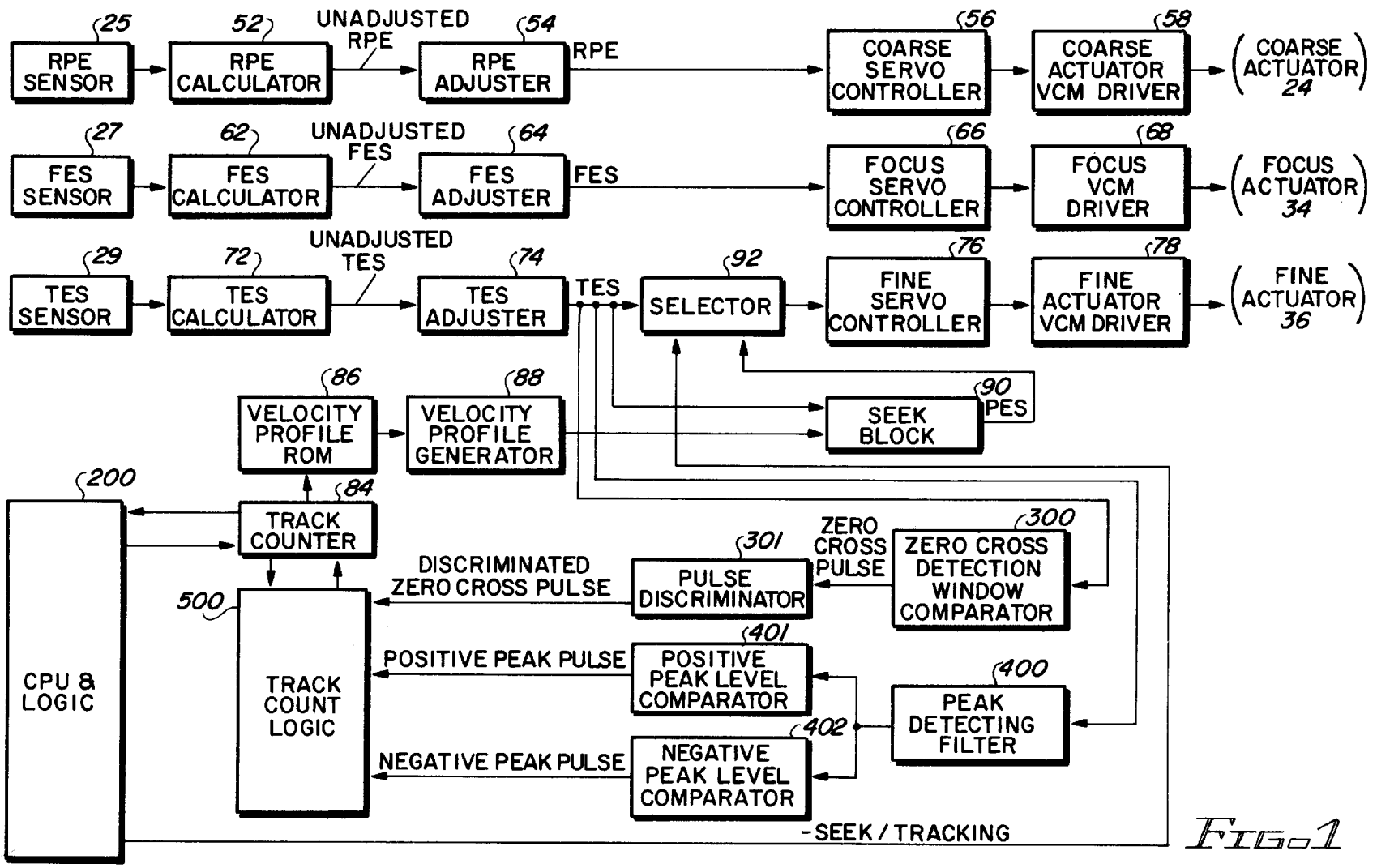
FIG. 1 is a block diagram showing a part of an embodiment of an optical disk drive according to the invention.

Referring now more particularly to the drawing, like numerals denote like features and structural elements in the various figures.

Figure 2:
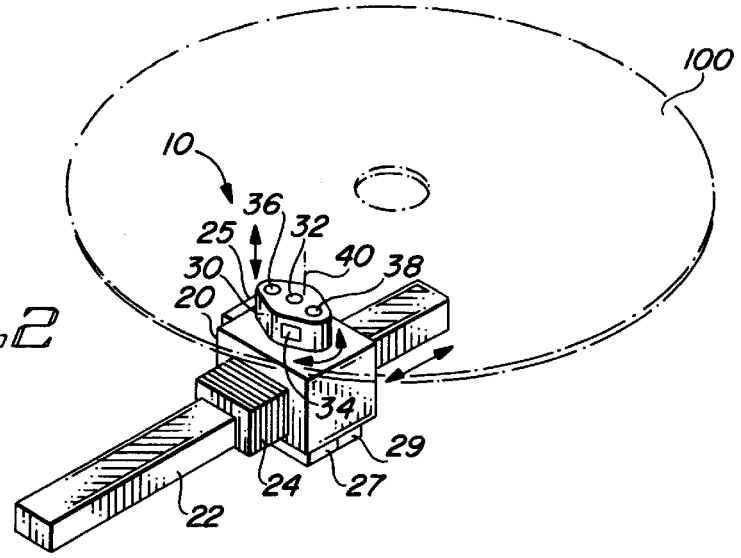
FIG. 2 is a perspective view showing another part of said embodiment.

FIG. 2 shows a part of an embodiment of an optical disk drive according to the invention. In the figure, an optical head 10 is composed of a coarse actuator 20 and a fine actuator 30. The coarse actuator 20 is supported by a rail 22 so that it can move freely in the radial direction of an optical disk 100 (in the direction of a seek operation), and is driven in the direction of the seek operation by a coarse actuator VCM (Voice Coil Motor) 24.

The fine actuator 30 is supported by the coarse actuator 20 through a shaft 32 so that it can move in the focusing and tracking directions and is driven in the focusing direction and in the tracking direction by a focus VCM 34 and a tracking VCM 36, respectively. The fine actuator 30 has a fixed objective lens 38 which a laser beam 40 is projected onto optical disk 100.

Also, coarse actuator 20 is provided with a relative position error (RPE) detecting sensor 25, a focus error signal (FES) detecting sensor 27, and a tracking error signal (TES) detecting sensor 29. The relative position error (RPE) detecting sensor 25 is, for example, a photo sensor with two split sensitive parts to detect the quantity of a relative deflection (rotational deflection from a neutral position) of the fine actuator 30 from the coarse actuator 20. The focus error signal (FES) detecting sensor 27 is, for example, a photo sensor with four split sensitive parts to detect a positional difference of a spot of the laser beam 40 from a focusing point on the optical disk 100. The tracking error signal (TES) detecting sensor 29 is, for example, a photo sensor with two split sensitive parts to detect a positional difference of a spot of laser beam 40 from the center of a track on the optical disk 100.

FIG. 1 shows another part of said embodiment. In the figure, an output of the relative position error (RPE) detecting sensor 25 is input to a RPE calculator 52. The RPE calculator 52, if the RPE detecting sensor 25 is a photo sensor with two split sensitive parts, calculates the difference between detecting signals from the two photo-sensitive parts and then outputs an unadjusted or a raw RPE. When the gain or offset of unadjusted RPE is adjusted to a RPE adjuster 54, an adjusted RPE can be obtained and the adjusted RPE thus obtained is provided to a coarse servo controller 56 and a tracking servo controller 76.

The RPE, to which low-pass filtering and compensation for phase lead have been applied by the coarse servo controller 56, is provided to a coarse actuator VCM driver 58 from which the driving current, according to the amplitude and sign of the RPE, that is, the quantity and direction of a deflection of the fine actuator 30 relative to the coarse actuator 20, is provided to the coarse actuator VCM 24.

An output of the FES detection sensor 27 is input to a FES calculator 62. The FES calculator 62, if the FES detecting sensor 27 is a photo sensor with four split sensitive parts, calculates the difference between a sum of detecting signals from a pair of photo sensitive parts and a sum of detecting signals from another pair of photo-sensitive parts and then outputs an unadjusted or a raw FES. When the offset of the unadjusted FES is adjusted by a FES adjuster 64, an adjusted FES can be obtained. The FES thus obtained is provided to a focus servo controller 66.

The FES, which low-pass filtering and compensation for phase lead have been applied by the focus servo controller 66, is provided to a focus VCM drive 68 from which the driving current, according to the amplitude and sign of the FES, that is, a positional difference and direction of a spot of the laser beam 40 from the focus point, is provided to the focus VCM 34.

An output of the TES detecting sensor 29 is input to a TES calculator 72. The TES calculator, if the TES detecting sensor 29 is a photo sensor with two split sensitive parts, calculates the difference between detecting signals from a pair of photo sensitive parts and outputs an unadjusted or a raw TES. When the gain and offset of the unadjusted TES are adjusted by the TES adjuster 74, an adjusted TES can be obtained and provided to the tracking servo controller 76, a tracking VCM driver 78 providing a driving signal for tracking to the tracking VCM 36.

The adjusted TES is also input to a window comparator 300 for zero cross detection in which a TES is checked to see whether the TES is within a predetermined range including an electric reference level (zero level). A zero cross pulse is output if the TES is within said range and a zero cross pulse is not generated if the TES is not within said range. As is obvious from the above, the window comparator 300 is used to detect whether the TES has crossed said zero level.

The zero cross pulse is input to a pulse discriminator 301, a digital low-pass filter which outputs only a pulse with a time width greater than or equal to a predetermined value within zero cross pulses. The pulse outputted from the pulse discriminator 301 is called hereafter a discriminated zero cross pulse. The discriminated zero cross pulse is inputted to a track count logic 500 which is a logic circuit that generates an output pulse, or counts the number of tracks only if predetermined pulses are input in predetermined order.

Further, the adjusted TES is input to a filter circuit (peak detecting filer) 400. The filter circuit 400 is a high-pass filter for passing the TES of high frequency with high gain and passing the TES of low frequency with low gain. In other words, the filter circuit 400 is a filter having an amplitude of TES during a low-velocity seek operation is smaller than the amplitude of TES during a high-velocity seek operation. An output signal from the filter circuit 400 is called hereafter a peak detection track cross signal to distinguish the output signal from the TES.

The peak detection track cross signal is input to a positive peak level comparator 401 in which the peak detection track cross signal is compared with a constant value approaching a positive peak and changes to a positive peak pulse whose state changes near the appropriate level, and, at the same time, is input to a negative peak level comparator 402 in which the peak detection track cross signal is compared with a constant value approaching a negative peak and change to a negative peak pulse whose state changes near the appropriate level. The positive peak pulse and the negative peak pulse output from positive peak level comparator 401 and negative peak level comparator 402, respectively, are input to track count logic 500.

The track count logic 500 functions in two types of count operation modes, high-velocity mode and low-velocity mode. In high-velocity mode, an output pulse is generated if the positive peak pulse and the negative peak pulse have been alternately input and, on the other hand, in low-velocity mode, an output pulse is generated if the positive peak pulse, the discriminated zero cross pulse, and the negative peak pulse have been input in this order. Each time the track count logic 500 outputs an pulse, the content of a track counter 84 is decreased by one. Accordingly, the track counter 84 is decreased when the positive peak pulse changes to the negative peak pulse and vice versa in high-velocity mode and is discriminated zero cross pulse changes in the predetermined order in low-velocity mode.

A change of track count logic 500 from high-velocity mode to low-velocity mode and vice versa takes place by means of a servo system controller (CPU and logic circuit) 200. The controller 200 can determine whether a current seek velocity is high or low, based on positional information as well as velocity information obtained from the TES, or the content of track counter 84. The seek velocity can be determined based on the content of track counter 84 since the relationship between the seek velocity and the number of tracks is indicated by a velocity profile ROM 86 so far as a seek velocity is under the control of the velocity profile ROM 86.

Figure 3:
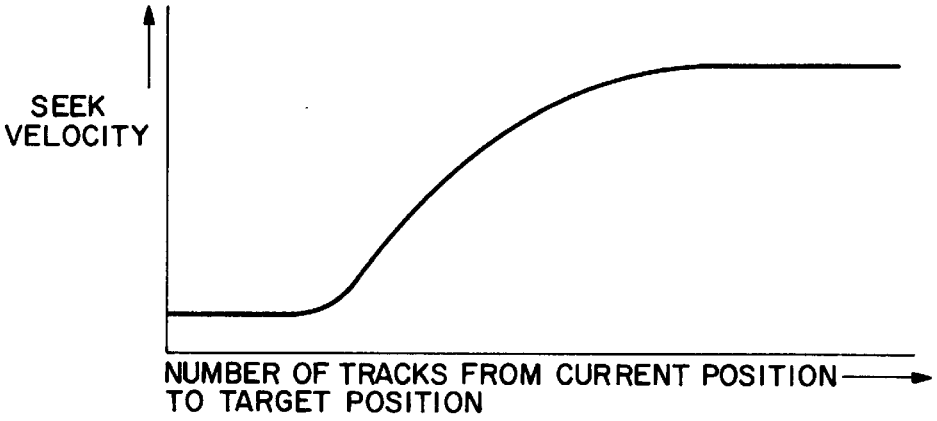
FIG. 3 is a graph showing a velocity profile of said embodiment.

The controller 200 is provided with the velocity profile ROM 86 in which information used for controlling the seek velocity, for example, the relation between a track distance from a current position to a target position and a desirable velocity, as in FIG. 3, used for controlling the seek velocity is stored. When information about the current position is provided based on the value of the track counter 84, the velocity profile ROM 86 outputs a desirable velocity, represented as a digital value, at the current position to a velocity profile generator 88 in which the digital value is converted to an analog value to output the analog value to a seek block 90. The seek block 90 compares the value obtained from the velocity profile generator 88 with the current velocity information conveyed by the TES to product a positioning error signal (PES) which is an integrated value of the result of the comparison. The PES is provided to a selector 92 to which the TES as well as the PES is provided. In seek operation mode, the selector 92 provides the PES to the fine servo controller 76 and, on the other hand, in tracking operation mode, the selector 92 provides the TES to the fine tracking servo controller 76. In seek operation mode, the selector 92 may provide PES to not only the fine tracking servo controller 76 but the coarse servo controller 56.

Figure 5:
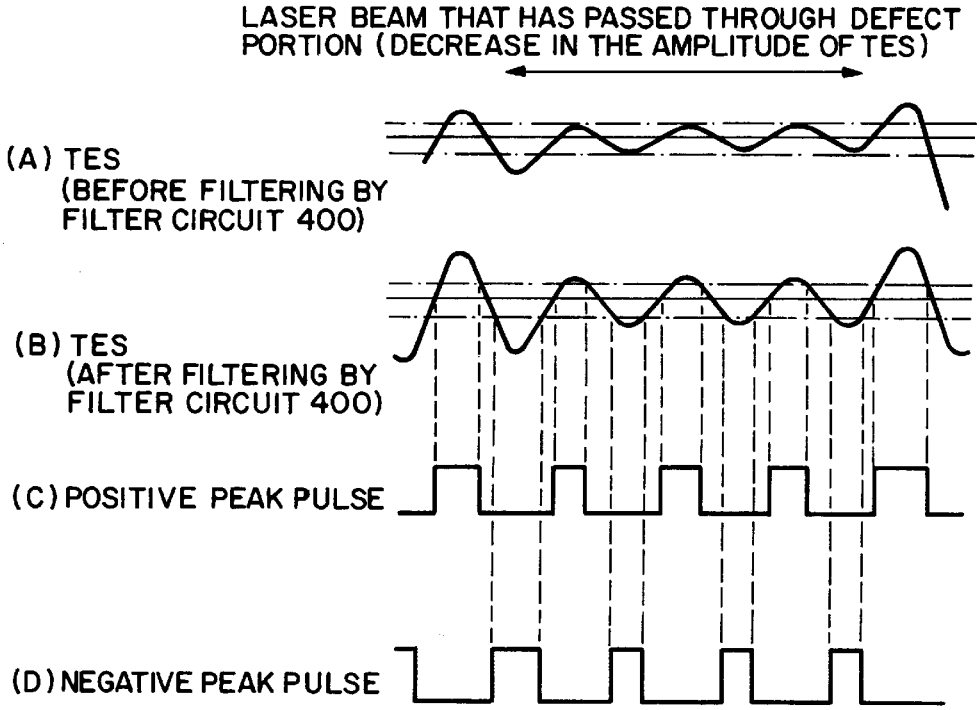
FIGS. 5(A)–(D) shows charts showing the waveforms of a TES, a TES which has passed through a high-pass filter, a positive peak pulse, and a negative peak pulse during a high-velocity seek operation.
Figure 6:
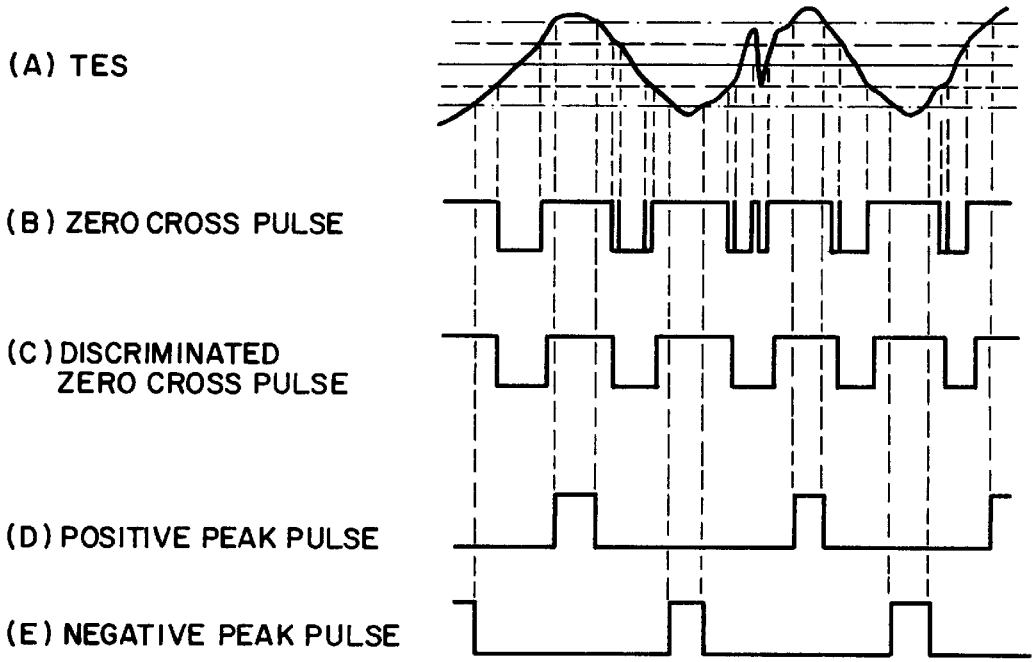
FIGS. 6(A)–(B) shows charts of the waveforms of a TES, a zero cross pulse, a discriminated zero cross pulse, a positive peak pulse, and a negative peak pulse during a low-velocity seek operation.

In the following, the operation of this embodiment is described by reference to FIG. 4 to FIG. 6.

Figure 4:
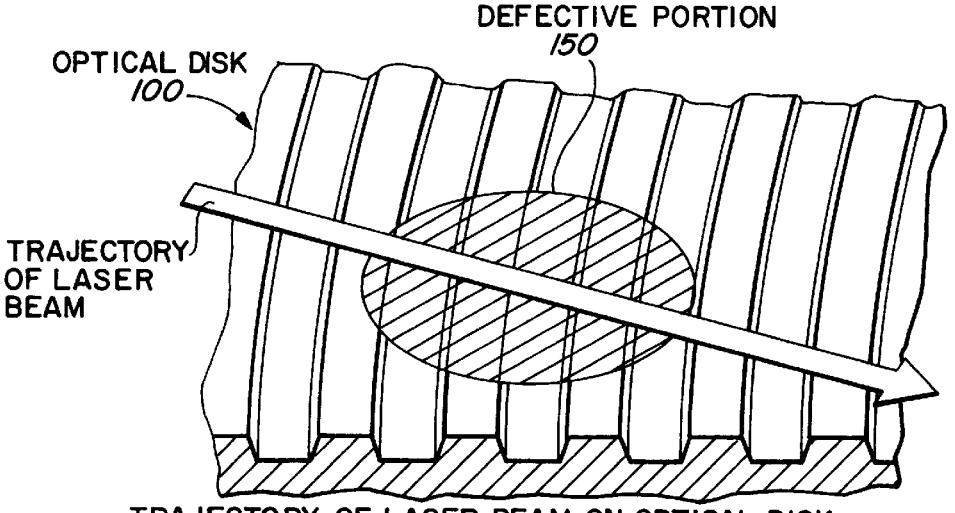
FIG. 4 is a ground plane showing the trajectory of a laser beam on an optical disk during a high-velocity seek operation.

FIG. 4 shows the trajectory of a laser beam on the optical disk 100 during a high-velocity seek operation. If a seek operation is performed at a high-velocity, a laser beam crosses more than one track over a defect portion 150. As the result of the effect due to the defect portion 150 on the TES during such a high-velocity seek operation, the amplitude of TES decreases while the laser beam moves through the defect portion 150. If the TES (whose amplitude has decreased) is input, as it is, to the level comparators 401 and 402, the amplitude of TES does not reach the reference levels of the level comparators 401 and 402 and the positive and negative peak pulses cannot be detected. In the embodiment, the TES (whose amplitude has decreased) is relatively amplified only during a high-velocity seek operation by the filter circuit 400 before inputting the TES to the level comparators 401 and 402, so as to be able to detect the positive and negative peak pulses.

The amplitude of TES, as described above, is relatively amplified only during a high-velocity seek operation, since the effect due to the defective portion 150 on the TES appears as a decrease in the amplitude of TES only during the high-velocity seek operation. The amplitude of TES during a low-velocity seek operation results in a decrease in the reference levels of the level comparators 401 and 402 and as a result of the decrease in the reference levels, extra undesired noises, which are apt to generate a peak and negative pulses, are picked up. During the high-velocity seek operation, the content of the track counter 84 is decreased only when a positive peak pulse and a negative peak pulse have been alternately generated.

Figure 16:
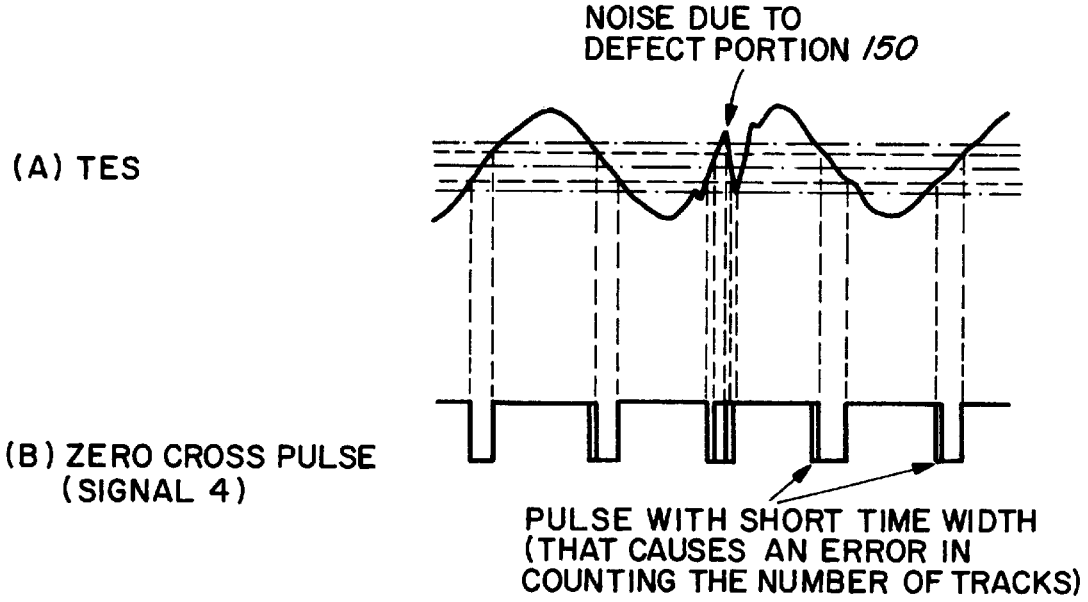
FIG. 16(A) and (B) shows waveform charts representing a failure in counting the number of tracks in said conventional track number counting means.

During a low-velocity seek operation, the effect due to the defective portion 150 on the TES, as shown in FIG. 16, appears as the generation of a noise that exceeds the window level (reference range) of the window comparator 300. The TES containing such a noise, as shown in FIG. 6, causes a pulse with short time width in a zero cross pulse, however, such a pulse with short time width is removed from the zero cross pulse by the pulse discriminator 301 and then a discriminated zero cross pulse is generated, as shown in FIG. 6, by the pulse discriminator. During the low-velocity seek operation, the track count logic 500 may decrease the content of the track counter 84 in response to the discriminated zero cross pulse. However, to count the number of tracks with a high accuracy, the track count logic 500 decreases the content of the track counter 84 in response to the generation of three types of pulses, a positive peak pulse, a negative peak pulse, and a discriminated zero cross pulse, in a predetermined order by means of the level comparators 401 and 402. The pulse discriminated 301 is used only during the low-velocity seek operation since if the pulse discriminator 301 is used when the high-velocity seek operation, during which the RES of high frequency is generated, is performed, the window comparator 300 generates only a pulse with short time width and an output from the pulse discriminator 301 remains a zero level.

At the start of a seek operation, the number of tracks from a seek start position to a target position 0 is stored in the track counter 84 and the stored value is decreased by subtraction for each track crossing during the seek operation. A seek velocity is determined based on the value stored in the track counter 84 by reference to velocity profile (FIG. 3) in the velocity profile ROM 86.

For a short time after the seek operation starts, as is obvious from the velocity profile (FIG. 3), the seek operation is performed at a high velocity. During a period of such a high-velocity seek operation, said track count means are in high-velocity mode in which a count is made based on transition in the states of a positive peak pulse and a negative peak pulse. If the controller 200 detects that the value contained in the track counter 84 is a predetermined value at a time when the seek operation is nearly completed, the controller 200 changes said tack count means from high-velocity mode to low-velocity mode in which a count is made based on transition in the states of a positive peak pulse, a negative peak pulse, and a discriminated zero cross pulse. Further, according to the peak detecting filter 400, the detection levels of a positive peak and a negative peak are equivalently decreased during the high-velocity seek operation and, on the other hand, the detection levels of the positive peak and the negative peak are increased during the low-velocity seek operation to always generate proper positive and negative pulses. Further, the pulse discriminator 301 generates a zero cross pulse independent of noise.

In said embodiment, a pulse with short time width caused by noise can be removed by the pulse discriminator 301, however, it will be recognized that the noise may be removed directly from the TES by placing the low-pass filter ahead of the window comparator 300 instead of using the pulse discriminator 301.

Figure 7:
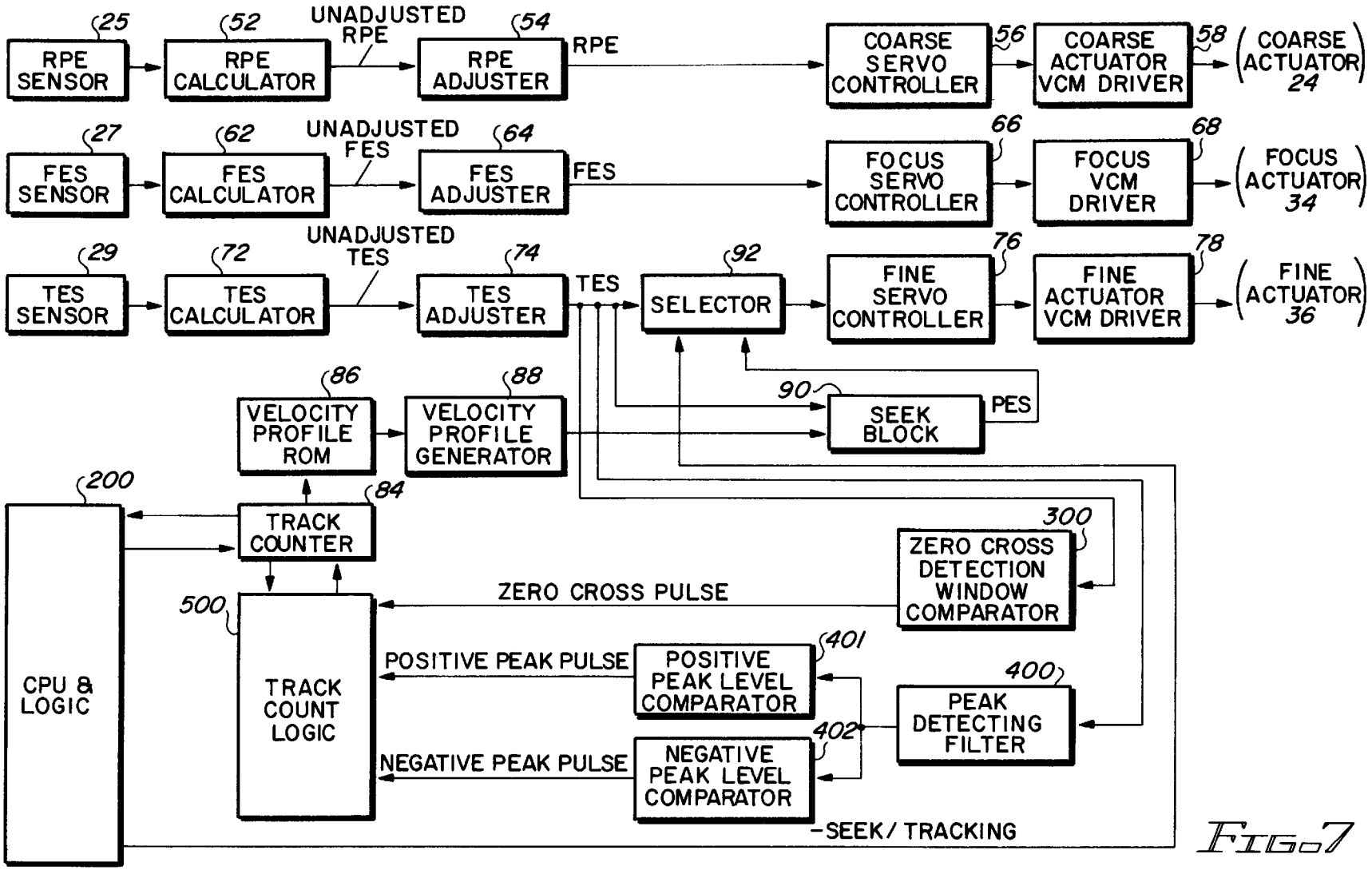
FIG. 7 to FIG. 11 are block diagrams showing alternative embodiments.

It will be appreciated that if the pulse discriminator 301 or the low-pass filter as not used, as shown in FIG. 7, the number of tracks may be counted based on a zero cross pulse or three types of pulses, a zero cross pulse, a positive peak pulse, and a negative peak pulse, during the high-velocity seek operation and based on two types of pulses, a positive peak pulse and a negative peak pulse during the low-velocity seek operation.

Figure 8:
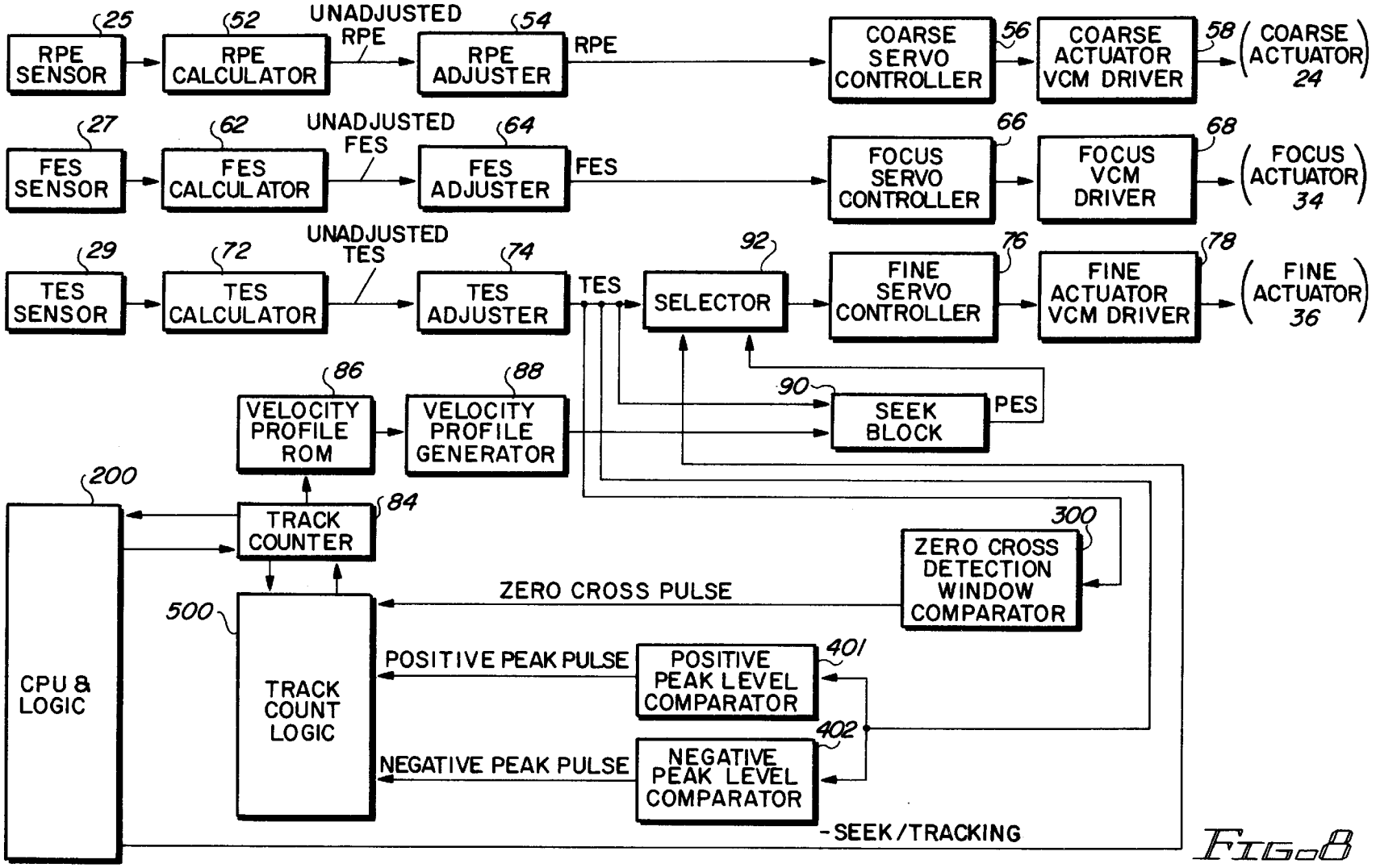

It will also be appreciated that if the filter circuit 400 is not used, as shown in FIG. 8, the number of tracks may be counted based on a zero cross pulse during the high-velocity seek operation and based on a positive peak pulse and a negative peak pulse during the low-velocity seek operation.

Figure 9:
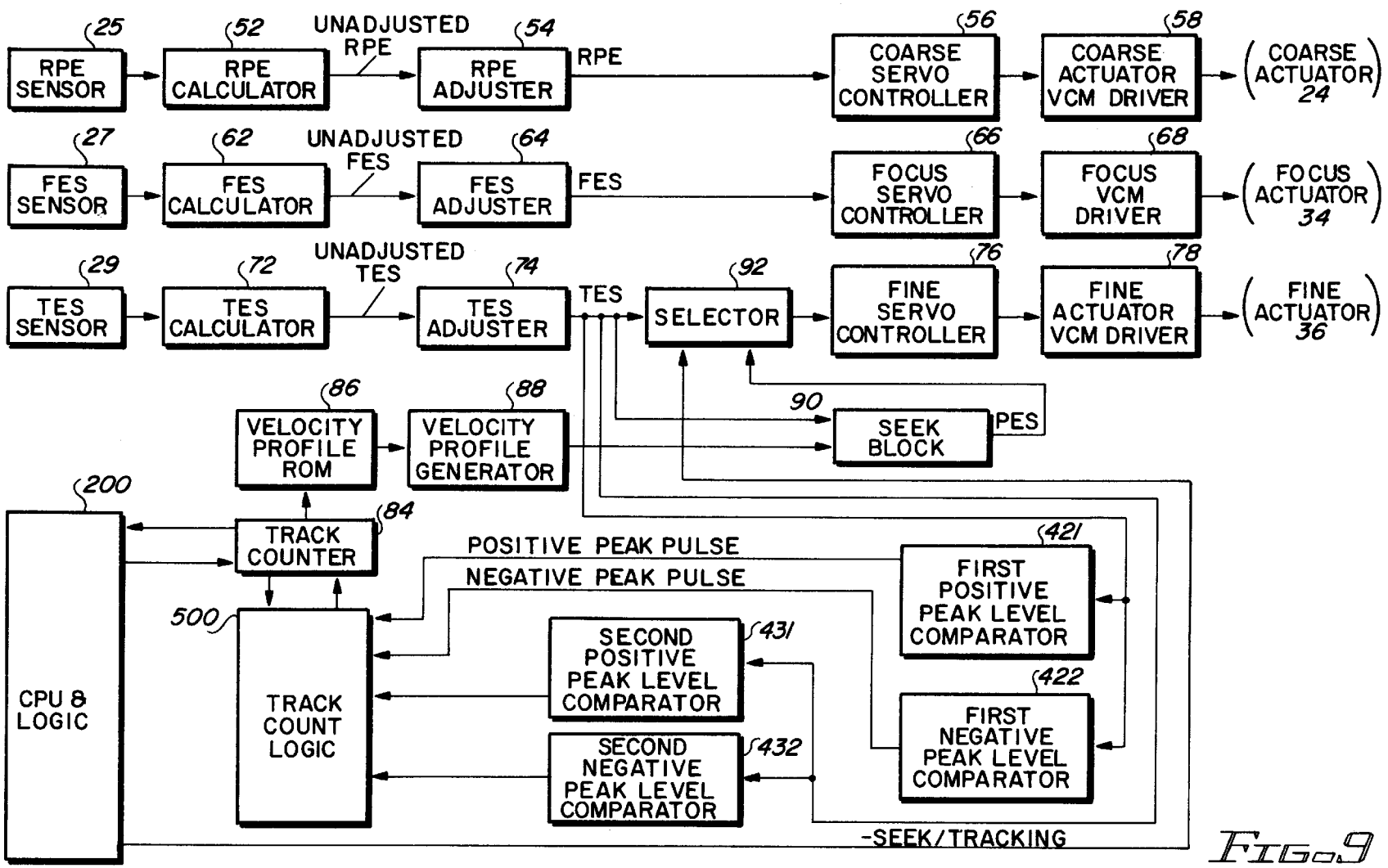

Referring to FIG. 9, it will also be appreciated that the first positive peak level comparator 421 generates a positive peak pulse when the TES is above a predetermined first positive level, the first negative peak level comparator 422 generates a negative peak pulse when the TES is below a predetermined first negative level, the second positive peak level comparator 431 generates a positive peak pulse when the TES is above a predetermined second positive level lower than said predetermined first positive level, and the second negative peak level comparator 432 generates a negative peak pulse when the TES is below a predetermined second negative level higher than said predetermined first negative level being used. The number of tracks may be counted during a low-velocity seek operation if said positive peak pulse and said negative peak pulse have been alternately input from said first positive peak level comparator 421 and negative peak level comparator 422, respectively and, on the other hand, the number of tracks may be counted during a high-velocity seek operation if said positive peak pulse and negative peak pulse have been alternately input from said second positive peak level comparator 431 and negative peak level comparator 432, respectively. Instead of using the filter circuit 400 to equivalently vary the detection levels of the positive and negative peak pulses in accordance with the frequency of the input TES, the levels to be compared may be varied according to seek velocity information or a stored value in the track counter 84.

Figure 10:
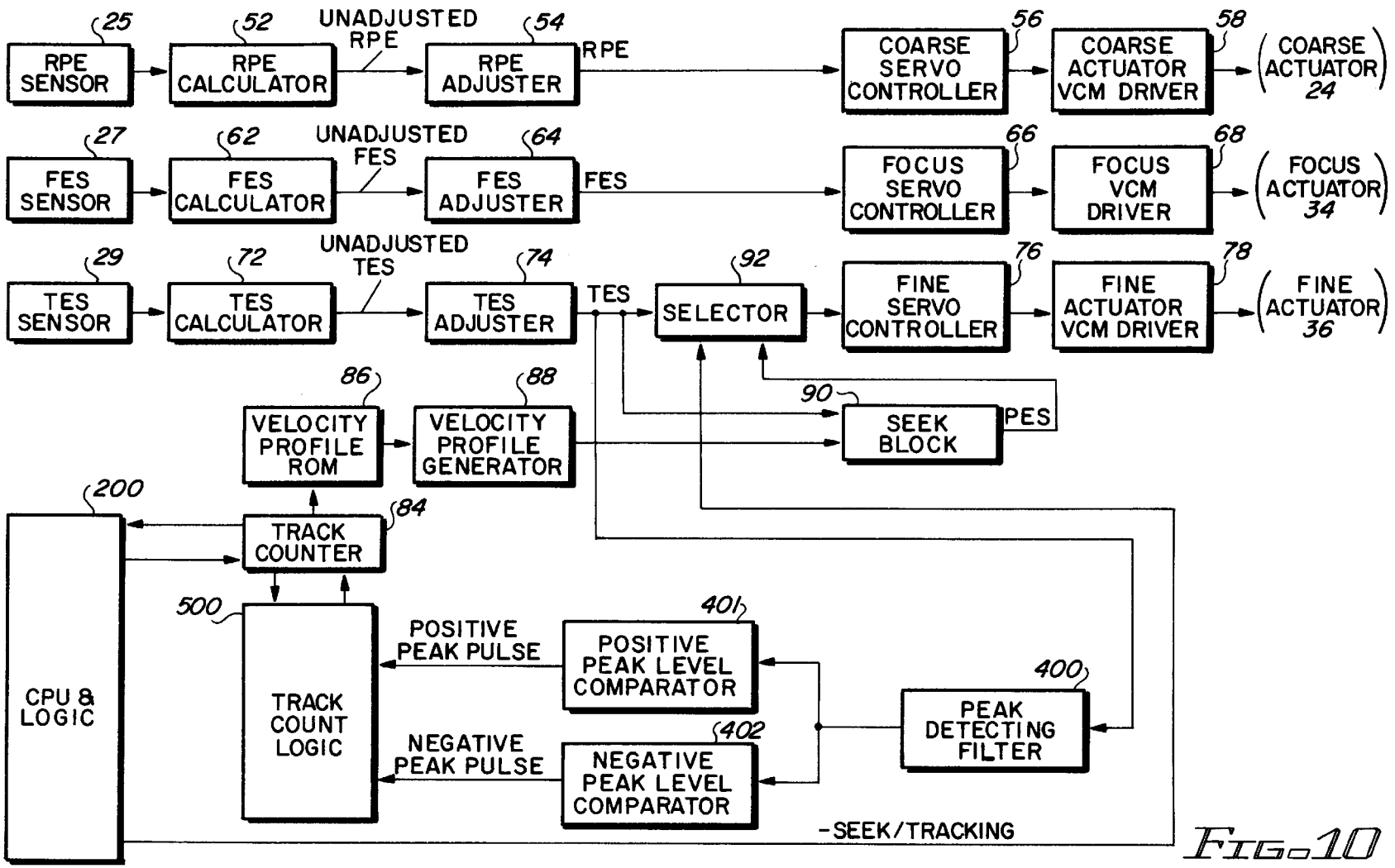
Figure 11:
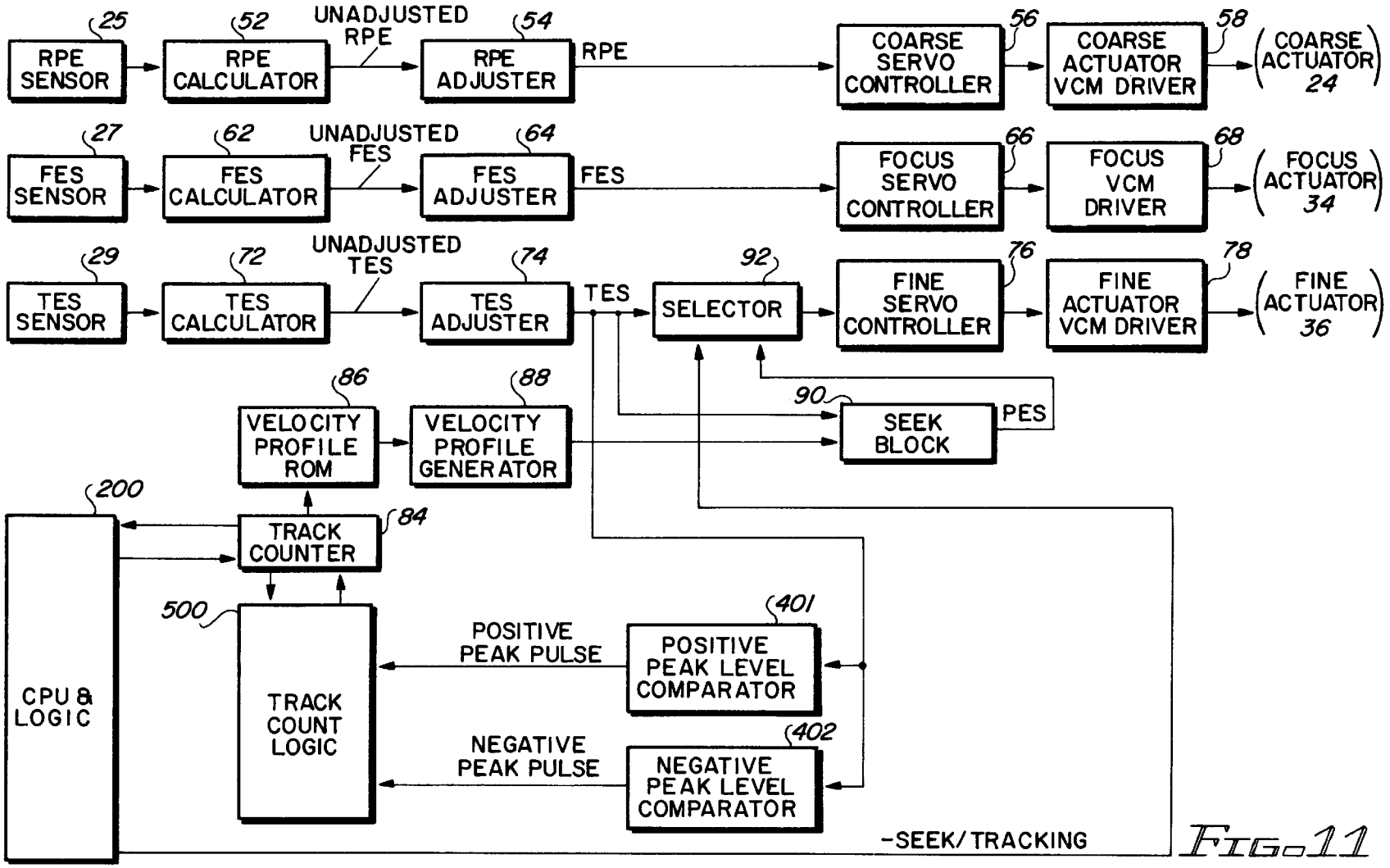

It will be appreciated also that the number of tracks may be counted, as shown in FIG. 10, based on two types of pulses, a positive peak pulse and a negative peak pulse whether the seek operation is performed at a high velocity or a low velocity and further, as shown in FIG. 11, without using the filter circuit 40.

Figure 12:
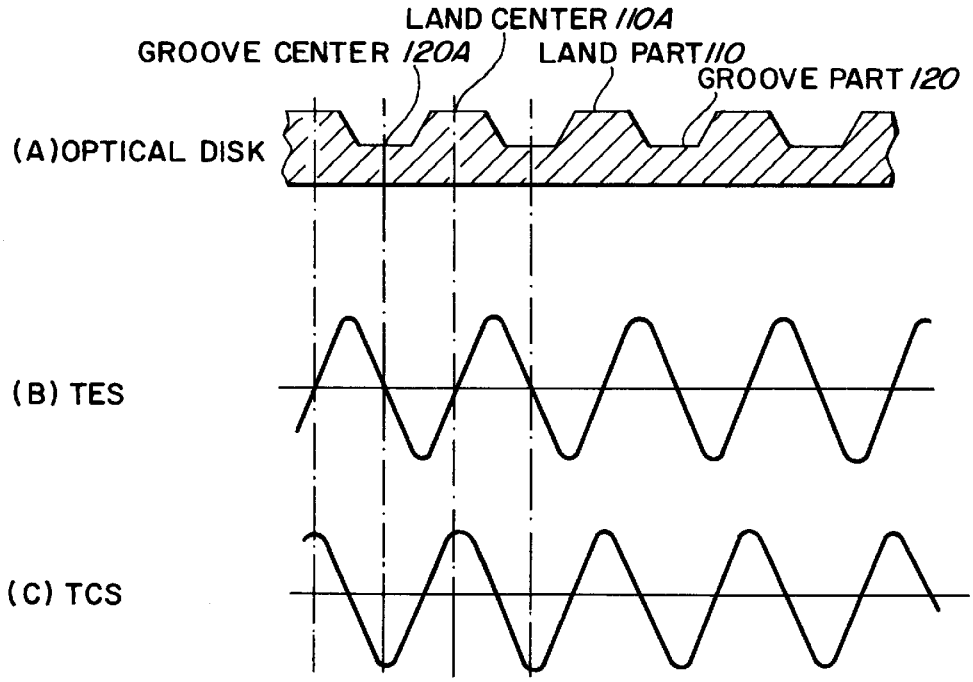
FIGS. 12(A)–(C) shows charts of the waveforms of a TES and a TCS with respect to the structure of an optical disk.
Figure 13:
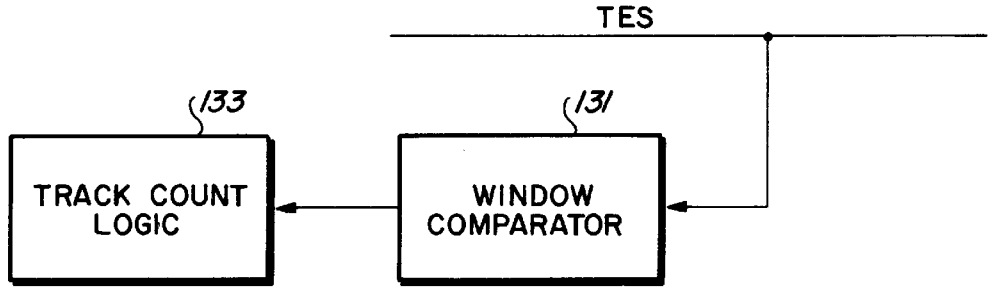
FIG. 13 (PRIOR ART)
FIG. 13 is a block diagram showing the structure of a conventional track number counting means.
Figure 14:
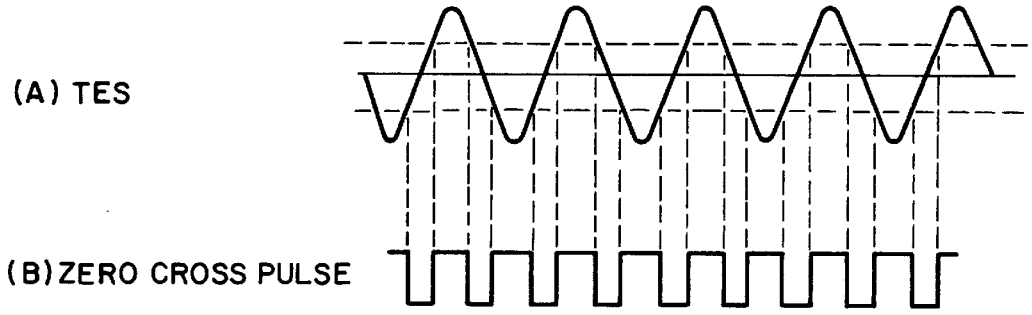
FIG. 14 (PRIOR ART)
FIG. 14(A) and (B) shows waveform charts representing the fundamentals of operations in said conventional track number counting means.
Figure 15:
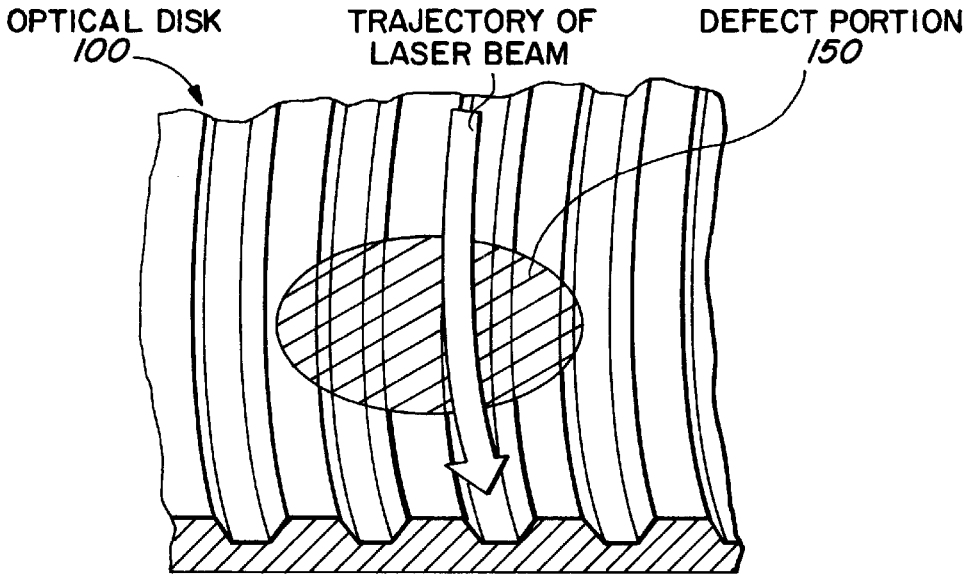
FIG. 15 is a ground place showing the trajectory of a laser beam on an optical disk during a low-velocity seek operation.

A TES indicating the deviation of a beam from the center of a track in the radial direction of the disk has been described as a TES shown in FIG. 12(B). However, it will be appreciated that a signal shown in FIG. 12(C) may be used as a signal indicating the deviation. The signal shown in FIG. 12(C) is sometimes called a TCS (Track Cross Signal). As is obvious from the figure, the polarity of the TCSs corresponding to the land part 110 and the groove part 120 are opposite to each other.

While the invention has been particularly shown and described with reference to a preferred embodiment thereof, it will be understood by those skilled in the art that various changes in form and details may be made therein without departing from the spirit and scope of the invention.

What is claimed is:

1. An optical disk drive comprising:

an optical head for projecting a laser beam onto the recording surface of an optical disk;

seek control means for moving said beam form a current rack to a target track over the tracks;

tracking error signal generating means for generating a tracking error signal (TES) which indicates the deviation of said beam from the center of a track in the radial direction of the disk; and track number counting means for counting, based on said TES, the number of tracks over which said optical head has moved, said track number counting means including a positive peak level comparator for generating a positive peak pulse when said TES is higher than a predetermined positive level, a negative peak level comparator, for generating a negative peak pulse when said TES is lower than a predetermined negative level, and a logic circuit for generating an output pulse when said positive peak pulse and said negative peak pulse have been alternately inputted thereto.

2. The optical disk drive of claim 1 wherein said track number counting means further comprises a filter circuit for passing said TES of high frequency with high gain and passing said TES of low frequency with low gain; said positive peak level comparator generating a positive peak pulse when said TES output from said filter circuit is higher than a predetermined positive level, said negative peak level comparator generating a negative peak pulse when said TES output from said filter circuit is lower then a predetermined negative level.

3. An optical disk drive comprising:

an optical head for projecting a laser beam onto the recording surface of an optical disk;

seek control means for moving said beam form a current rack to a target track over the tracks;

tracking error signal generating means for generating a tracking error signal (TES) which indicates the deviation of said beam from the center of a track in the radial direction of the disk; and track number counting means for counting, based on said TES, the number of tracks over which said optical head has moved, said track number counting means including a first positive peak level comparator for generating a positive peak pulse when said TES is higher than a predetermined positive level, a first negative peak level comparator, for generating a negative peak pulse when said TES is lower than a predetermined negative level, a second positive peak level comparator for generating a positive peak pulse when said TES is higher than a second predetermined positive level lower than said first predetermined positive level and a second negative peak level comparator for generating a negative peak pulse when said TES is lower than a second predetermined negative level higher than said first predetermined negative level, and a logic circuit generating an output pulse when said positive peak pulse and said negative peak pulse have been alternately input thereto from said first positive peak level comparator and said first negative peak level comparator during a low-velocity seek operation and generating an output pulse when said positive peak pulse and said negative peak pulse have been alternately input thereto form said second positive peak level comparator and said second negative peak level comparator during a high-velocity seek operation.

4. An optical disk drive comprising:

an optical head for projecting a laser beam onto the recording surface of an optical disk;

seek control means for moving said beam from a current track to a target track over the tracks;

tracking error signal generating means for generating a tracking error signal (TES) which indicates the deviation of said beam from the center of a track in the radial direction of the disk; and track number counting means for counting, based on said TES, the number of tracks over which said optical head has moved, wherein said track number counting means includes a window comparator for generating a zero cross pulse in response to a time when said TES is within a predetermined range including a zero level, a positive peak level comparator for generating a positive peak pulse in response to a time when said TES is higher than a predetermined positive level, a negative peak level comparator for generating a negative peak pulse in response to a time when said TES is lower than a predetermined negative level, and a logic circuit for generating an output pulse in response to a time when said zero cross pulse said positive peak pulse, and said negative peak pulse have been input thereto in a predetermined order.

5. The optical disk drive of claim 4 wherein said track number counting means further comprises a filter circuit for said TES of high frequency with high gain and passing said TES of low frequency with low gain, said positive peak level comparator generating positive peak pulse when said TES output from said filter circuit is higher than a predetermined positive level, said negative peak level comparator generating a negative peak pulse when said TES output from said filter circuit is lower than a predetermined negative level.

6. An optical disk drive comprising:

an optical head for projecting a laser beam onto the recording surface of an optical disk;

seek control means for moving said beam from a current track to a target track over the tracks;

tracking error signal generating means for generating a tracking error signal (TES) which indicates the deviation of said beam from the center of a track in the radial direction of the disk; and track number counting means for counting, based on said TES, the number of tracks over which said optical head has moved, wherein said track number counting means includes a window comparator for generating a zero cross pulse in response to a time when said TES is within a predetermined range including a zero cross level, a positive peak level comparator for generating a positive peak pulse in response to a time when said TES is higher than a predetermined positive level, a negative peak level comparator for generating a negative peak pulse in response to a time when said TES is lower than a predetermined negative level, and a logic circuit for generating an output pulse in response to a time when said positive peak pulse and said negative peak pulse from said positive peak level comparator and said negative peak level comparator, respectively, have been alternately input thereto during a low-velocity seek operation and, on the other hand, for generating an output pulse in response to a time when a zero cross pulse has been input thereto from said window comparator during a high-velocity seek operation.

7. An optical disk drive comprising:

an optical head for projecting a laser beam onto the recording surface of an optical disk;

seek control means for moving said beam from a current track to a target track over the tracks;

tracking error signal generating means for generating a tracking error signal (TES) which indicates the deviation of said beam from the center of a track in the radial direction of the disk; and track number counting means for counting, based on said TES, the number of tracks over which said optical head has moved, said track number counting means including a window comparator for generating a zero cross pulse in response to a time when said TES is within a predetermined range including a zero level, a pulse discriminator for generating a discriminated zero cross pulse in response to said zero cross pulse of which time width is longer than a predetermined value, a filter circuit for passing said TES of high frequency with high gain and passing said TES of low frequency with low gain, a positive peak level comparator for generating a positive peak pulse in response to a time when an output signal from said filter circuit is higher than a predetermined positive level, a negative peak level comparator for generating a negative peak pulse in response to a time when an output signal from said filter circuit is lower than a predetermined negative level, and a logic circuit for generating an output pulse in response to a time when said discriminated zero cross pulse, said positive peak pulse, and said negative peak pulse have been input thereto in a predetermined order during a low-velocity seek operation and generating an output pulse in response to a time when said positive peak pulse and said negative peak pulse have been alternately input thereto during a high-velocity seek operation.

8. A method for counting the number of tracks on an optical disk as a laser beam moves from a current track to a target track on the recording surface of said optical disk, the method comprising the steps of:

generating a tracking error signal (TES) which indicates a deviation of said laser beam from the center of a track in the radial direction of said disk;

generating a positive peak pulse when said TES is higher than a predetermined positive level;

generating a negative peak pulse when said TES is lower than a predetermined negative level; and generating a signal which indicates that said laser beam is crossing a track when said positive peak pulse and said negative peak pulse have been alternately generated.

9. The method of claim 8 further comprising, after said step of generating a TES, passing said TES of high frequency with high gain and said TES of low frequency with low gain and then proceeding to the remaining steps.

10. A method for counting the number of tracks on an optical disk as a laser beam moves from a current track to a target track on the recording surface of said optical disk, the method comprising the steps of:

generating a tracking error signal (TES) which indicates a deviation of said laser beam from the center of a track in the radial direction of said disk;

generating a zero cross pulse when said TES is within a predetermined range including a zero level;

generating a positive peak pulse when said TES is higher than a predetermined positive level;

generating a negative peak pulse when said TES is lower than a predetermined negative level; and generating a signal which indicates that said laser beam is crossing a track when all or part of said zero cross pulse, said positive peak pulse, and said negative peak pulse used according to a seek velocity have been generated in a predetermined order.

* * * * *